United States Patent
DeMarco et al.

(10) Patent No.: US 10,714,926 B2
(45) Date of Patent: Jul. 14, 2020

(54) SELF-DISCONNECTING POWER SOURCE APPARATUS

(71) Applicant: INTERNATIONAL BUSINESS MACHINES CORPORATION, Armonk, NY (US)

(72) Inventors: Dominic L. DeMarco, Hyde Park, NY (US); Thomas D. Fitzsimmons, Elverson, PA (US); Troy A. Flagg, Hyde Park, NY (US); Ryan P. Golden, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 159 days.

(21) Appl. No.: 15/642,503

(22) Filed: Jul. 6, 2017

(65) Prior Publication Data

US 2019/0013665 A1 Jan. 10, 2019

(51) Int. Cl.
*H02H 5/08* (2006.01)
*H02H 7/18* (2006.01)

(52) U.S. Cl.
CPC .............. *H02H 5/08* (2013.01); *H02H 5/083* (2013.01); *H02H 7/18* (2013.01)

(58) Field of Classification Search
CPC ....................................................... H02H 5/08
See application file for complete search history.

(56) References Cited

U.S. PATENT DOCUMENTS 8,355,233 B2 1/2013 Schumacher et al.

2010/0033883 A1* 2/2010 Simon .................... H02H 5/083
361/52

(Continued)

FOREIGN PATENT DOCUMENTS

| GB | 2540230 A1 | 1/2017 |
| WO | 2013142868 A1 | 9/2013 |
| WO | 2015187484 A1 | 12/2015 |

OTHER PUBLICATIONS

Wu, Yuping, et al. "Composite anode material for lithium ion battery with low sensitivity to water." Electrochemistry communications 2.9 (2000): 626-629.

(Continued)

*Primary Examiner* — Scott Bauer
(74) *Attorney, Agent, or Firm* — Cantor Colburn LLP; Teddi Maranzano (57) ABSTRACT

A power source apparatus and associated method for protecting an electrical device such as a mobile device from an electric shortage are disclosed. The power source apparatus can be provided within the electrical device to provide power to device components. The power source apparatus can include a power source such as a battery, one or more triggering components, and a disconnection component. The triggering component(s) can be connected to a moisture/fluid detection circuit of the electrical device. Upon receiving an input signal indicative of detected moisture/fluid within the electrical device, the triggering component(s) send a disconnection signal to the disconnection component which may be a solenoid. The disconnection component disconnects the power source from device circuitry of the electrical device. The power source apparatus can also include a reconnection component that can be manually actuated by a user or automatically actuated to reconnect the power source to the device circuitry.

9 Claims, 4 Drawing Sheets

(56) References Cited

U.S. PATENT DOCUMENTS

| | | | |
|---|---|---|---|
| 2010/0053835 A1 | 3/2010 | Kwag et al. | |
| 2014/0307356 A1* | 10/2014 | Hong | H02H 5/083 |
| | | | 361/78 |
| 2015/0001200 A1 | 1/2015 | Harper et al. | |
| 2015/0016001 A1 | 1/2015 | Quirk et al. | |
| 2015/0288036 A1* | 10/2015 | Hartmeyer | H02H 5/083 |
| | | | 429/50 |
| 2015/0346127 A1* | 12/2015 | Kalinichev | G01N 27/048 |
| | | | 361/86 |
| 2016/0218556 A1 | 7/2016 | Slaby et al. | |
| 2017/0256935 A1* | 9/2017 | Hurula | H02H 3/06 |
| 2017/0288451 A1* | 10/2017 | Trusty | G06F 1/3206 |
| 2017/0373514 A1* | 12/2017 | Troberg | H02J 7/0026 |

OTHER PUBLICATIONS

Dominic L. DeMarco et al., "Self-Disconnecting Power Source Apparatus", U.S. Appl. No. 15/800,138, filed Nov. 1, 2017.
List of IBM Patents or Patent Applications Treated as Related; (Appendix P), Filed Nov. 1, 2017); 2 pages.

* cited by examiner

SELF-DISCONNECTING POWER SOURCE APPARATUS

BACKGROUND

The present invention relates generally to protection against fluid-induced electrical shortages in an electrical device, and more specifically, to a power source apparatus that provides such protection.

When an electrical device, particularly a mobile device such as a smartphone, is dropped in a fluid such as water, the internal device circuitry may come in contact with the conductive water causing short circuits to occur and unchecked currents to flow to unintended components potentially resulting in inoperability of the device. In such a scenario, the device may remain inoperable even when removed from the fluid and dried.

SUMMARY

In one or more example embodiments of the invention, a method for protecting an electrical device from an electrical shortage is disclosed. In an example embodiment of the invention, the method includes providing a power source apparatus that includes a power source, one or more triggering components, and a disconnection component. The method further include receiving, at the one or more triggering components, an input signal indicative of a triggering event, and sending, by the one or more triggering components, a disconnection signal to the disconnection component to cause the power source to be disconnected from circuitry of the electrical device.

In one or more other example embodiments of the invention, an electrical device configured to avoid an electrical shortage is disclosed. In an example embodiment of the invention, the electrical device includes device circuitry and a power source apparatus. The power source apparatus includes a power source, one or more triggering components, and a disconnection component. The power source apparatus is configured to receive, at the one or more triggering components, an input signal indicative of a triggering event, and send, by the one or more triggering components, a disconnection signal to the disconnection component to cause the power source to be disconnected from the device circuitry.

In one or more other example embodiments of the invention, a power source apparatus configured to protect an electrical device from an electrical shortage is disclosed. In an example embodiment of the invention, the power source apparatus includes a power source, one or more triggering components, and a disconnection component. The power source apparatus is configured to receive, at the one or more triggering components, an input signal indicative of a triggering event, and send, by the one or more triggering components, a disconnection signal to the disconnection component cause the power source to be disconnected from circuitry of the electrical device.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Example embodiments of the invention include, among other things, a power source apparatus and associated method for protecting an electrical device from an electrical shortage. Example embodiments of the invention also include an electrical device that includes such a power source apparatus. The power source apparatus may include a power source such as a battery, a disconnection component configured to disconnect the power source from device circuitry external to the power source apparatus, and one or more triggering components for triggering the disconnection component. In certain example embodiments of the invention, the disconnection component may be an electro-mechanical component such as a solenoid. The triggering component(s) may be connections provided between the power source apparatus and a component external to the power source apparatus such as a moisture/humidity/liquid detection circuit (referred to hereinafter as a moisture detection circuit) of the electrical device. While a moisture/humidity/liquid detection circuit is provided as an example herein, it should be appreciated that any device component or sensor configured to detect a device contaminant may be connected to the power source apparatus and may provide input signals to the power source apparatus. In addition, it should be appreciated that a solenoid is merely an example type of disconnection component that may be used.

Upon receiving an input signal from the moisture detection circuit, the triggering component(s) may send a disconnection signal to the disconnection component. For example, the triggering component(s) may apply a current to a solenoid to cause a magnetic field to be generated that in turn causes internal leads of a battery within the power source apparatus to disconnect from external terminals of the battery that are in contact with circuitry of the electrical device. In this manner, power is no longer provided from the power source apparatus, or more specifically, the power source within the apparatus to device circuitry provided externally to the apparatus, thereby avoiding the possibility of an electrical shortage in the device. This ensures that when the electrical device is fully or partially flooded with water, no current from the battery will be capable of harming other device components.

In certain example embodiments, the power source apparatus may further include a reconnection component. The reconnection component may be a mechanical lever, switch, or the like that may cause the internal battery leads of the power source apparatus to re-engage with the external battery terminals responsive to mechanical actuation by a user of the electrical device. In this manner, a user may determine the timing of restoring power to the electrical device. In other example embodiments, the reconnection component may be automatically triggered when the triggering event is no longer present. For example, cessation of receipt of an input signal from the moisture detection circuit or receipt of a different input signal that indicates that the triggering event is no longer present, may cause the triggering component(s) to actuate the reconnection component.

Example embodiments of the invention provide various technical features, technical effects, and/or improvements to technology. For instance, example embodiments of the invention include a power source apparatus and associated method that provide the technical effect of preventing electrical shortages in a device by disconnecting a power source within the power source apparatus from external device circuitry in response to detection of moisture, humidity, water, or the like within the device. This technical effect results in an improvement to fluid-based power toggled circuitry technology. In particular, conventional fluid-based power toggled circuitry is provided outside of the battery itself, and is therefore vulnerable to water damage, for example. If such conventional power toggled circuitry is damaged, it can fail and power can continue to be provided from the battery to the device components, leading to short circuits and potentially device failure.

A power source apparatus in accordance with example embodiments of the invention, however, contains within a waterproof housing both the power source (e.g., battery) and the circuitry that is configured to disconnect the power source from the device circuitry external to the apparatus. As a result, even if the electrical device is flooded with water, for example, the circuitry within the power source apparatus is unaffected and can properly function to disconnect the power source from components of the electrical device provided externally to the power source apparatus. It should be appreciated that the above examples of technical effects and technological improvements provided by example embodiments of the invention are merely illustrative and not exhaustive.

Example Embodiments

Figure 1:
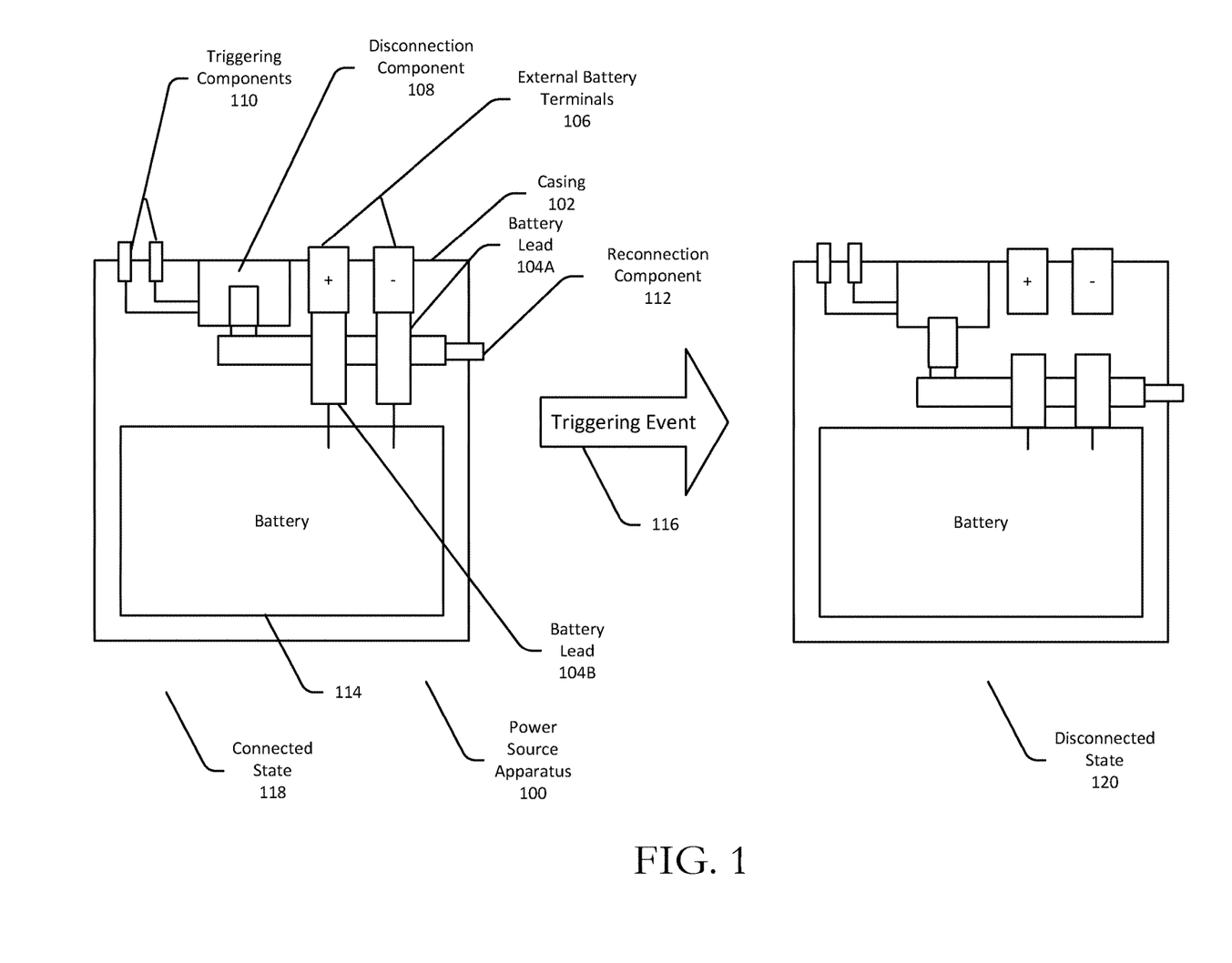
FIG. 1 is a schematic diagram that illustrates a transition between a connected state in which a battery is connected to device circuitry and a disconnected state in which the battery is disconnected from the device circuitry in response to a triggering event in accordance with one or more example embodiments of the invention.
Figure 2:
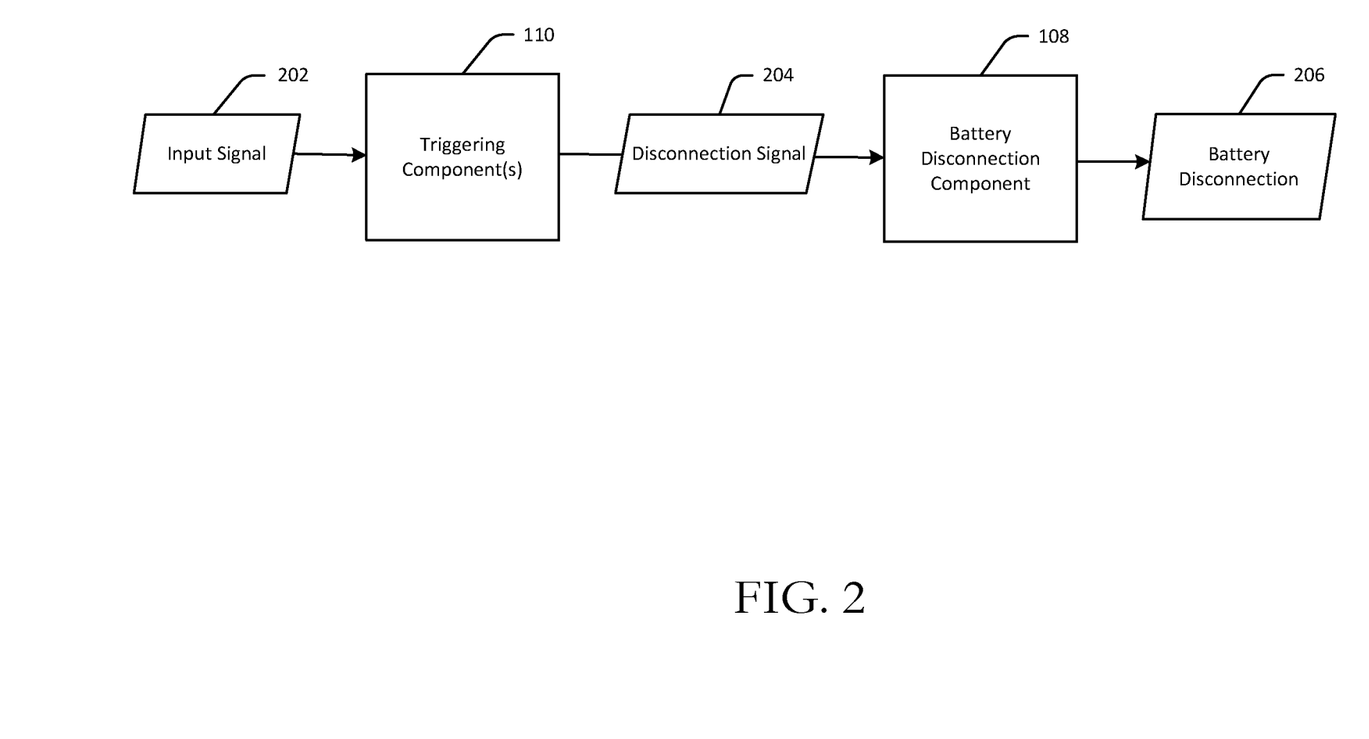
FIG. 2 is a schematic data flow diagram illustrating the transition between the connected state and the disconnected state in accordance with one or more example embodiments of the invention.
Figure 3:
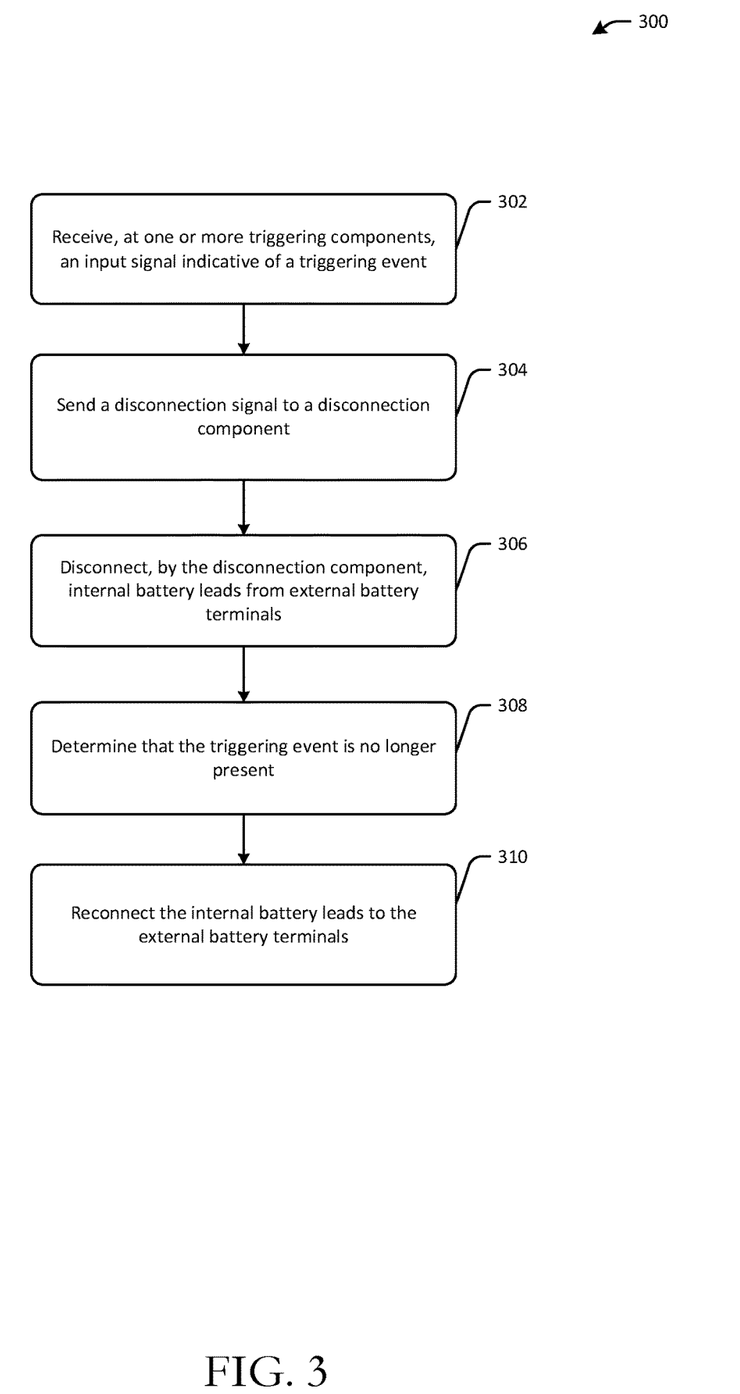
FIG. 3 is a process flow diagram of an illustrative method for transitioning between a connected state in which a battery is connected to device circuitry and a disconnected state in which the battery is disconnected from the device circuitry in response to a triggering event in accordance with one or more example embodiments of the invention.

FIG. 1 is a schematic diagram that illustrates a transition between a connected state in which a battery is connected to device circuitry and a disconnected state in which the battery is disconnected from the device circuitry in response to a triggering event. FIG. 2 is a schematic data flow diagram illustrating the transition between the connected state and the disconnected state. FIG. 3 is a process flow diagram of an illustrative method 300 for transitioning between the connected state and the disconnected state.

Each operation of the method 300 may be performed by one or more components of a power source apparatus in accordance with example embodiments of the invention. While the power source apparatus may be described herein as being implemented in hardware, it should be appreciated that any component of the power source apparatus may be implemented in any combination of hardware, software, and/or firmware. If implemented in software and/or firmware, a collection of one or more program modules may be provided that include computer-executable instructions that when executed by a processing circuit cause one or more operations of the method 300 to be performed. A device or apparatus described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 1, a power source apparatus 100 is depicted. The power source apparatus may be provided within an electrical device such as a mobile device. The mobile device may be a smartphone, a tablet, a personal digital assistant, a personal computer, an electronic reader, or any other suitable electronic device.

The power source apparatus 100 may include a casing 102, which may be a waterproof casing that protects internal components of the power source apparatus 100 from water that may have penetrated other internal portions of the device. Within the casing 102 may be provided a power source such as a battery 114. The battery 114 may include internal battery leads 104A, 104B which may be connected to external battery terminals 106 when the power source apparatus is in a connected state 118. The connected state 118 may refer to a state in which an electrical connection exists between the battery 114 and internal device circuitry provided externally to the power source apparatus 100 such that the battery 114 is capable of providing power to other components of the electrical device. The power source apparatus 100 may further include one or more triggering components 110 that may be connected to a moisture detection circuit or the like provided within the device but externally to the power source apparatus 100. In addition, the triggering component(s) 110 may also be connected to a disconnection component 108 that is provided internally within the power source apparatus 100.

Referring now to FIGS. 1-3 in conjunction with one another, at block 302 of the method 300, the triggering component(s) 110 may receive an input signal 202 indicative of a triggering event 116. The input signal 202 may be received from a moisture detection circuit or the like that is configured to sense moisture, humidity, the presence of a liquid, or the like within the electrical device. Such a moisture detection circuit may be provided internally within the device but external from the power source apparatus 100. When the moisture detection circuit detects presence of a device contaminant (e.g., water) it may be generated the input signal 202 that may be received by the triggering component(s) 110 at block 302 of the method 300.

At block 304 of the method 300, the triggering component(s) 110 may send a disconnection signal 204 to the disconnection component 108 in response to receipt of the input signal 202. Then, at block 306 of the method 300, the disconnection component 108 may disconnect 206 the internal battery leads 104A, 104B from the external battery terminals 106 to cease providing power from the battery 114 to device components external to the power source apparatus 100. In certain example embodiments of the invention, the disconnection component 108 may be an electro-mechanical component such as a solenoid. In such example embodiments, the disconnection signal 204 may be a current applied by the triggering component(s) 110 to the solenoid that causes a magnetic field to be generated in the solenoid, which in turn, causes the internal battery leads 104A, 104B to disconnect from the external battery terminals 106 that are in contact with circuitry of the electrical device. In this manner, power is no longer provided from the power source apparatus 100, or more specifically, the battery 114 within the apparatus 100 to device circuitry provided externally to the apparatus 100, thereby avoiding the possibility of an electrical shortage in the device. At block 306 of the method 300, the power source apparatus 100 transitions from the connected state 118 to a disconnected state 120 in which power is no longer supplied to the device components.

In certain example embodiments, the power source apparatus may further include a reconnection component 112. The reconnection component 112 may be a mechanical lever, switch, or the like that may cause the internal battery leads 104A, 104B to re-engage with the external battery terminals 106 responsive to mechanical actuation by a user of the electrical device. In this manner, a user may determine the timing of restoring power to the electrical device.

In other example embodiments, the reconnection component 112 may be automatically triggered when the triggering event 116 is no longer present. For example, at block 308 of the method 300, the power source apparatus 100 may determine that the triggering event 116 is no longer present. This determination may be made based on cessation of receipt of the input signal 202 from the moisture detection circuit or receipt of a different input signal that indicates that the triggering event 116 is no longer present. Then, at block 310 of the method 300, the triggering component(s) 110 may automatically actuate the reconnection component 112 to cause the internal battery leads 104A, 104B to re-engage with the external battery terminals, thereby providing power once more from the battery 114 to other device components.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 4:
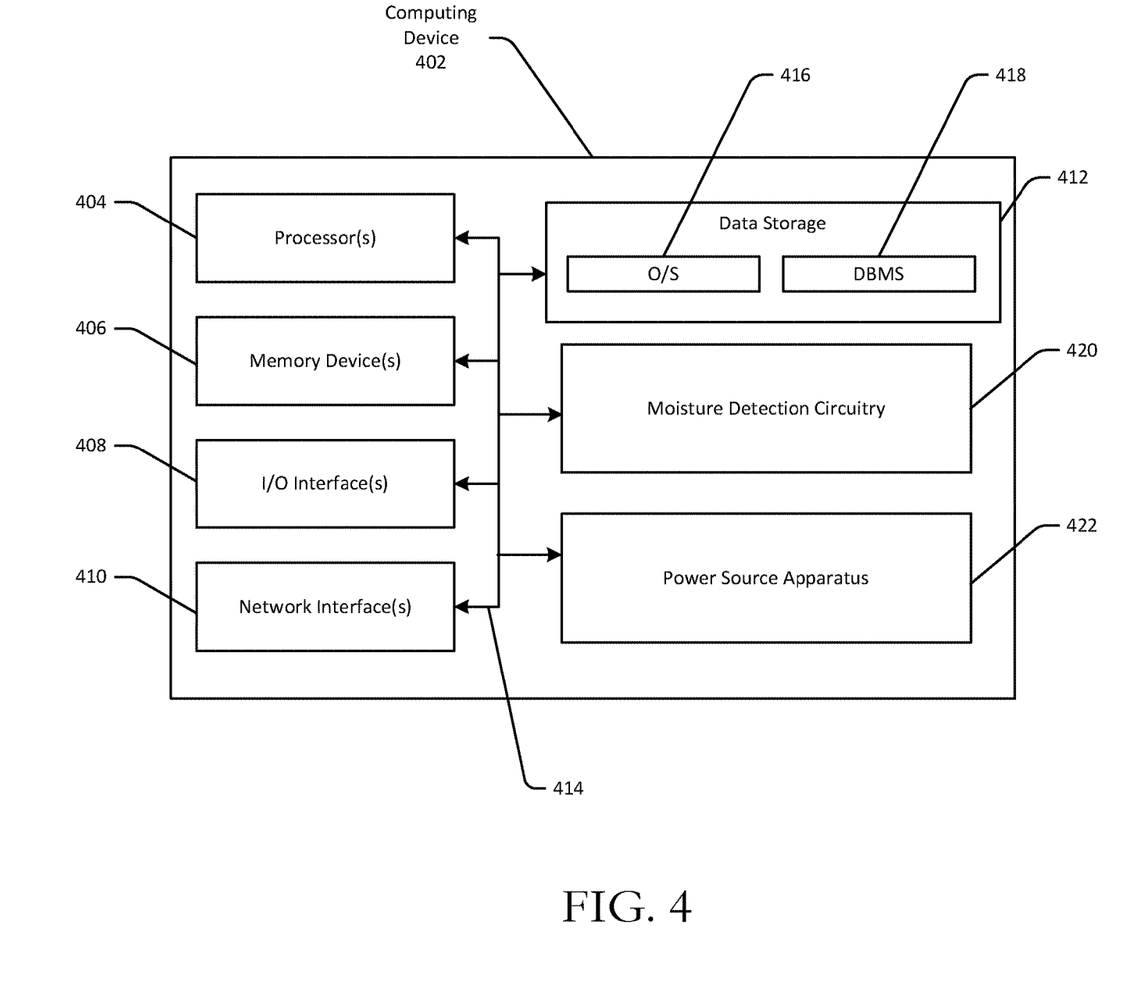
FIG. 4 is a schematic diagram of an illustrative computing device configured to implement one or more example embodiments of the invention.

FIG. 4 is a schematic diagram of an illustrative computing device 402 configured to implement one or more example embodiments of the invention. The computing device 402 may represent an illustrative configuration of an electrical device containing a power source apparatus in accordance with example embodiments of the invention.

In an illustrative configuration, the computing device 402 may include one or more processors (processor(s)) 404, one or more memory devices 406 (generically referred to herein as memory 406), one or more input/output ("I/O") interface(s) 408, one or more network interfaces 410, and data storage 412. The computing device 402 may further include one or more buses 414 that functionally couple various components of the computing device 402. In addition, the device 402 may include moisture detection circuitry 420 configured to detect the presence of humidity/moisture/liquid within the device 402. It should be appreciated that the device 402 may include in addition to, or as an alternative to, the moisture detection circuitry 420, and other suitable circuit or sensor configured to detect any potential device contaminant. The device 402 may further include a power source apparatus 422 which may correspond to the power source apparatus 100 depicted in FIG. 1.

The bus(es) 414 may include at least one of a system bus, a memory bus, an address bus, or a message bus, and may permit the exchange of information (e.g., data (including computer-executable code), signaling, etc.) between various components of the computing device 402. The bus(es) 414 may include, without limitation, a memory bus or a memory controller, a peripheral bus, an accelerated graphics port, and so forth. The bus(es) 414 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 406 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 406 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 406 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 412 may include removable storage and/or non-removable storage including, but not limited to, magnetic storage, optical disk storage, and/or tape storage. The data storage 412 may provide non-volatile storage of computer-executable instructions and other data. The memory 406 and the data storage 412, removable and/or non-removable, are examples of computer-readable storage media (CRSM) as that term is used herein.

The data storage 412 may store computer-executable code, instructions, or the like that may be loadable into the memory 406 and executable by the processor(s) 404 to cause the processor(s) 404 to perform or initiate various operations. The data storage 412 may additionally store data that may be copied to memory 406 for use by the processor(s) 404 during the execution of the computer-executable instructions. Moreover, output data generated as a result of execution of the computer-executable instructions by the processor(s) 404 may be stored initially in memory 406 and may ultimately be copied to data storage 412 for non-volatile storage.

More specifically, the data storage 412 may store one or more operating systems (O/S) 416; one or more database management systems (DBMS) 418 configured to access the memory 406 and/or one or more external data store(s) (not shown); and one or more program modules, applications, engines, computer-executable code, scripts, or the like (not shown). Any of the components depicted as being stored in data storage 412 may include any combination of software, firmware, and/or hardware. The software and/or firmware may include computer-executable instructions (e.g., computer-executable program code) that may be loaded into the memory 406 for execution by one or more of the processor(s) 404 to perform any of the operations described earlier.

Although not depicted in FIG. 4, the data storage 412 may further store various types of data utilized by components of the computing device 402. Any data stored in the data storage 412 may be loaded into the memory 406 for use by the processor(s) 404 in executing computer-executable instructions. In addition, any data stored in the data storage 412 may potentially be stored in the data store(s) 426 and may be accessed via the DBMS 418 and loaded in the memory 406 for use by the processor(s) 404 in executing computer-executable instructions.

The processor(s) 404 may be configured to access the memory 406 and execute computer-executable instructions loaded therein. For example, the processor(s) 404 may be configured to execute computer-executable instructions of the various program modules, applications, engines, or the like of the computing device 402 to cause or facilitate various operations to be performed in accordance with one or more embodiments of the invention. The processor(s) 404 may include any suitable processing unit capable of accepting data as input, processing the input data in accordance with stored computer-executable instructions, and generating output data. The processor(s) 404 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 404 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 404 may be capable of supporting any of a variety of instruction sets.

Referring now to other illustrative components depicted as being stored in the data storage 412, the O/S 416 may be loaded from the data storage 412 into the memory 406 and may provide an interface between other application software executing on the computing device 402 and hardware resources of the computing device 402. More specifically, the O/S 416 may include a set of computer-executable instructions for managing hardware resources of the computing device 402 and for providing common services to other application programs. In certain example embodiments, the O/S 416 may include or otherwise control execution of one or more of the program modules depicted as being stored in the data storage 412. The O/S 416 may include any operating system now known or which may be developed in the future including, but not limited to, any server operating system, any mainframe operating system, or any other proprietary or non-proprietary operating system.

The DBMS 418 may be loaded into the memory 406 and may support functionality for accessing, retrieving, storing, and/or manipulating data stored in the memory 406, data stored in the data storage 412, and/or data stored in one or more external data store(s) (not shown). The DBMS 418 may use any of a variety of database models (e.g., relational model, object model, etc.) and may support any of a variety of query languages. The DBMS 418 may access data represented in one or more data schemas and stored in any suitable data repository. The data store(s) that may be accessible by the computing device 402 via the DBMS 418 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 402, the input/output (I/O) interface(s) 408 may facilitate the receipt of input information by the computing device 402 from one or more I/O devices as well as the output of information from the computing device 402 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 402 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more of the network(s) 1106 via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 402 may further include one or more network interfaces 410 via which the computing device 402 may communicate with any of a variety of other systems, platforms, networks, devices, and so forth. The network interface(s) 410 may enable communication via one or more networks which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the computing device 402 may include alternate and/or additional hardware, software, or firmware components beyond those described or depicted without departing from the scope of the invention. More particularly, it should be appreciated that software, firmware, or hardware components depicted as forming part of the computing device 402 are merely illustrative and that some components may not be present or additional components may be provided in various embodiments.

One or more operations of the method 300 may be performed by a computing device 402 having the illustrative configuration depicted in FIG. 4, or more specifically, by one or more hardware components, program modules, engines, applications, or the like executing on such a device 402. It should be appreciated, however, that such operations may be implemented in connection with numerous other device configurations including in a distributed manner with one or more remote servers.

The operations described and depicted in the illustrative method of FIG. 3 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 3 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An electrical device configured to avoid an electrical shortage, the device comprising:
   device circuitry; and
   a power source apparatus comprising a power source, one or more triggering components, a disconnection component, and a reconnection component comprising a mechanical switch, wherein the power source and the disconnection component are contained within a waterproof housing, and the power source apparatus is configured to:
   receive, at the one or more triggering components, an input signal indicative of a triggering event;
   send, by the one or more triggering components, a disconnection signal to the disconnection component;
   disconnect the power source from the device circuitry; and
   reconnect the power source to the circuitry of the electrical device,
   wherein the triggering event is fluid being detected within the electrical device, and wherein the input signal is received from a fluid detection circuit of the electrical device.

2. The electrical device of claim 1, wherein the power source is a battery, and wherein disconnecting the power source from the device circuitry comprises disconnecting internal leads of the battery from external terminals of the battery that are in contact with the device circuitry.

3. The electrical device of claim 1, wherein the disconnection component is a solenoid.

4. The electrical device of claim 1, wherein the reconnecting the power source to the device circuitry is responsive to mechanical actuation of the reconnection component by a user of the electrical device.

5. The electrical device of claim 1, wherein the power source apparatus is further configured to:
   determine that the triggering event is no longer present; and
   automatically actuate the reconnection component to reconnect the power source to the device circuitry.

6. A power source apparatus configured to protect an electrical device from an electrical shortage, the power source apparatus comprising:
   a power source;
   one or more triggering components;
   a disconnection component;
   a reconnection component comprising a mechanical switch; and
   a waterproof housing containing the power source and the disconnection component,
   wherein the power source apparatus is configured to:
   receive, at the one or more triggering components, an input signal indicative of a triggering event;
   send, by the one or more triggering components, a disconnection signal to the disconnection component;
   disconnect the power source from circuitry of the electrical device; and
   reconnect the power source to the circuitry of the electrical device,
   wherein the triggering event is fluid being detected within the electrical device, and wherein the input signal is received from a fluid detection circuit of the electrical device.

7. The power source apparatus of claim 6, wherein the power source is a battery, and wherein disconnecting the power source from the circuitry of the electrical device comprises disconnecting internal leads of the battery from external terminals of the battery that are in contact with the circuitry of the electrical device.

8. The power source apparatus of claim 6, wherein the disconnection component is a solenoid.

9. The power source apparatus of claim 6, wherein the reconnecting the power source to the circuitry of the electrical device is responsive to mechanical actuation of the reconnection component by a user of the electrical device.

* * * * *